United States Patent [19]

Williams et al.

[11] Patent Number: 5,050,556
[45] Date of Patent: Sep. 24, 1991

[54] CONTROL SYSTEM FOR AN INTERNAL COMBUSTION ENGINE

[75] Inventors: David Williams, Kingsbury; David K. Bryers; David Nutton, both of Solihull, all of England

[73] Assignee: Lucas Industries Public Limited Company, Birmingham, England

[21] Appl. No.: 402,190

[22] Filed: Sep. 5, 1989

[30] Foreign Application Priority Data

Sep. 9, 1988 [GB] United Kingdom ............... 8821230
Apr. 28, 1989 [GB] United Kingdom ............... 8909824

[51] Int. Cl.⁵ .................... F02D 41/14; F02D 43/04
[52] U.S. Cl. .................... 123/425; 123/426; 123/435; 123/494
[58] Field of Search ........... 123/425, 435, 494, 426

[56] References Cited

U.S. PATENT DOCUMENTS

| | | | |
|---|---|---|---|
| 4,304,203 | 12/1981 | Garcea et al. | 123/425 |
| 4,381,748 | 5/1983 | Eckert et al. | 123/494 |
| 4,463,733 | 8/1984 | Tsai | 123/425 |
| 4,535,740 | 8/1985 | Ma | 123/425 |
| 4,556,035 | 12/1985 | Aoki et al. | 123/494 |
| 4,736,724 | 4/1988 | Hamburg et al. | 123/435 |
| 4,760,830 | 8/1988 | Bullis et al. | 123/425 |
| 4,919,099 | 4/1990 | Extance et al. | 123/435 |

FOREIGN PATENT DOCUMENTS 60-88869 5/1985 Japan .................. 123/425

Primary Examiner—Andrew M. Dolinar
Attorney, Agent, or Firm—Nixon & Vanderhye

[57] ABSTRACT

A control system for an internal combustion engine has an ignition timing control device and a combustion duration control device such as a mixture controller. Sensors detect the start and end of combustion which are compared with a look-up table of target values for the engine speed and load to provide error signals. The processed error signals provide corrections which are added to base values from look-up tables of ignition timing and mixture and supplied to the control devices so as to tend to eliminate the error signals, so that the engine runs with its designed start of combustion and combustion duration values.

18 Claims, 9 Drawing Sheets

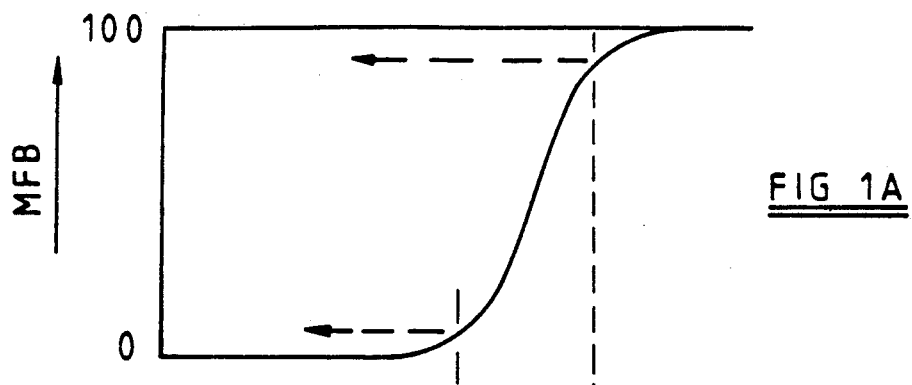
FIG 1A
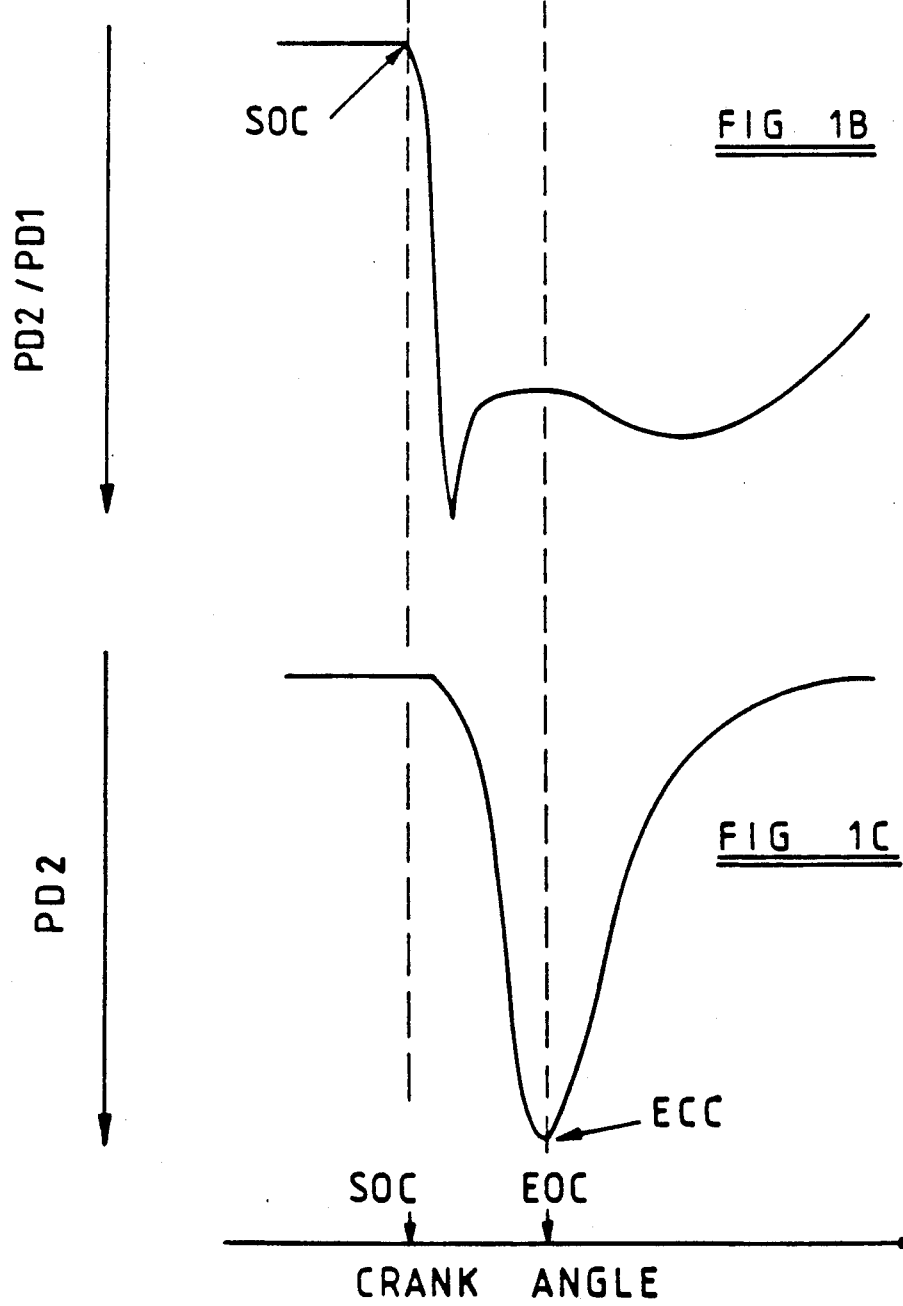
FIG 1B
FIG 1C

CONTROL SYSTEM FOR AN INTERNAL COMBUSTION ENGINE

BACKGROUND OF THE INVENTION a. Field of the Invention

This invention relates to a control system for an internal combustion engine.

It is well known to control the ignition timing and fuel mixture of an engine as a predetermined function of engine operating conditions. In modern engine control systems, the predetermined function is preprogrammed in a look-up table addressed, for example, by engine speed and load. Such a predetermined function is designed by the engine manufacturer to give a satisfactory compromise between the conflicting demands of various engine performance parameters such as levels of noxious exhaust emissions, particularly nitrogen oxides, fuel efficiency, level of combustion noise and vehicle driveability. Unfortunately, such a predetermined function cannot take account of variables which occur in use and so the desired values for the engine performance parameters are usually not achieved Examples of these variables are errors in the mixture control device, variations in fuel composition, variations between production engines and test engines, ageing effects, and changes in ambient conditions.

b. Description of the Prior Art

In order to compensate for some of these variables, it is known to measure engine outputs, such as output torque or exhaust oxygen concentration, and then provide a feedback signal for correcting ignition timing or the fuel mixture. Such a feedback signal will usually only provide compensation to the actual engine output which is measured and desired values for performance parameters related to other engine outputs will usually not be achieved.

As will now be described, various proposals have been made for making measurements on the combustion process itself and using such measurements to provide corrections to the ignition timing or fuel mixture.

In a paper entitled "Flame speed standardization between cylinders by feedback control of individual fuel injector pulse width", by T Hands et al, IMechE paper C58/88, there is described a system in which an ionization probe is located at the opposite end of a combustion chamber from the spark plug. The time which elapses between the instant of ignition (spark generation) and arrival of the flame at the probe is measured and used as a parameter to control the air to fuel ratio of the fuel mixture. Thus, this system attempts to compensate for variations in the burn rate of the fuel mixture. However, between the instant of ignition and commencement of combustion, there is a delay period which is subject to variability and so this system will not provide an accurate measurement of burn rate.

In GB-A-2 141 259, there is described a system in which burn rate is measured, with an ionization probe located in a combustion chamber. The measured burn rate is compared with a target burn rate and the resulting error is used to provide a steady state correction either to the air-to-fuel ratio or the ignition timing, but not both.

In GB-A-2 104 956, there is described a control system for a compression ignition engine provided with exhaust gas recirculation. In this system, the delay period between the initial injection of fuel and commencement of combustion is measured by using a pressure sensor located in a combustion chamber. The delay period is used as a parameter to control exhaust gas recirculation.

In unpublished United Kingdom Patent Application 8705905, there is described a system in which an optical arrangement is used to detect the crankshaft position at the start of combustion and this is used to control ignition timing.

None of these systems is capable of providing complete compensation for errors in the combustion process and so each of these systems suffers from the disadvantage that uncorrected errors in the combustion process are likely to lead to departures of engine performance parameters from their designed values.

SUMMARY OF THE INVENTION

According to first aspect of this invention, there is provided a control system for an internal combustion engine, comprising a first device for controlling the timing of the combustion process and a second device for controlling the duration of the combustion process, characterized by means for providing first and second signals representing respectively the actual positions of the crankshaft at which the combustion process starts and ends, means for determining a desired position of the crankshaft for the start of the combustion process, and also a desired position of the crankshaft for the end of the combustion process or a desired duration for the combustion process, the determining means determining the desired crankshaft positions or the desired crankshaft position and desired duration in accordance with engine operating conditions, and means for correcting the timing and duration of the combustion process in accordance with a control strategy so as to cause the actual start of the combustion process to occur at the desired position and to cause the actual end of the combustion process to occur at the desired position or the actual duration of the combustion process to be equal to the desired duration, the correcting means being responsive to the first and second signals and to the outputs of the determining means and providing outputs for the first and second control devices.

Both the timing and duration of the combustion process have an effect on engine performance parameters such as levels of noxious exhaust emissions, fuel efficiency, level of combustion noise, and vehicle driveability. Consequently, by correcting the timing and duration of the combustion process so as to achieve desired values for these two parameters, the system of this invention ensures that the engine performance parameters are kept as close as possible to their designed values.

In a preferred embodiment, said determining means determines desired positions of the crankshaft for the start and end of the combustion process, said correcting means compares the desired and actual positions of the crankshaft for the start of the combustion process to provide a first error signal and the desired and actual positions of the crankshaft for the end of the combustion process to provide a second error signal, and said correcting means uses said first and second error signals, respectively, to provide outputs to said first and second devices.

Conveniently, said means for providing said second signal representing the end of the combustion process comprises an optical sensor arranged to sense light generated during combustion within a combustion chamber and having the peak of its spectral response within the red region.

Preferably, said peak spectral response lies in the range 850 to 950 nm. Conveniently the optical sensor is a photodiode made from a silicon-based material.

Conveniently, said means for providing said first and second signals comprises first and second optical sensors having spaced spectral responses and arranged to sense light generated during combustion in a combustion chamber, said providing means calculates the ratio of the outputs of the first and second sensors and uses this ratio for providing said first signal, and uses the output of one of the sensors to provide said second signal.

Preferably, said one of the sensors has the peak of its spectral response in the red region. Conveniently, where said first and second optical sensors each have their spectral responses in the red region, the response of said one of the sensors has the longer wavelength.

In a spark ignition engine, said first device for controlling the timing of the combustion process may comprise a device for controlling the timing of the ignition sparks and said second device for controlling the duration of the combustion process may comprise a device for controlling the dilution of the fuel mixture with either air or recirculated exhaust gas.

In a compression ignition engine, said first device for controlling the timing of the combustion process may comprise a device for controlling the timing of fuel injection and said second device for controlling the duration in the combustion process may comprise a device for controlling the rate of fuel injection or, alternatively, a device for controlling the dilution of the fuel mixture with recirculated exhaust gas.

Preferably, the correcting means is arranged to correct the actual start of the combustion process more quickly than the actual end or the actual duration of the combustion process.

Preferably, the correcting means is arranged to form a first error signal from the difference between the first signal and the desired position of the crankshaft at the start of the combustion process and a second error signal from the difference between the second signal and the desired position of the crankshaft at the end of the combustion signal, and to correct the actual start and the actual end of the combustion process in accordance with integrals of the first and second error signals, respectively, with the rate of integration of the first error signal being faster than the rate of integration of the second error signal.

Preferably the first device includes means for providing a base value for the timing of the combustion process in accordance with engine operating conditions, the second device includes means for providing a base value for the duration of the combustion process in accordance with engine operating conditions, and the correcting means includes first means for applying a correction to the base value for the timing in accordance with engine operating conditions and second means for applying a correction to the base value for the duration in accordance with engine operating conditions. Preferably the correcting means is arranged to update the correction applied by the first and second means for the prevailing engine operating conditions in accordance with the time integrals of the first and second error signals.

It is thus possible to provide a system in which any interaction between control of the start and end of the combustion process is overcome. Also, any tendency of the system toward instability is avoided or reduced. In response to any disturbance to the combustion process, the system responds quickly by returning the timing of the start of combustion to the design value and more slowly by correcting the duration of the combustion process. Thus, in the case where the timing of the combustion process is controlled by altering the ignition timing and the duration is controlled by altering the strength of the combustible mixture, any disturbance results in a rapid response of the ignition timing and a slower response by the mixture strength. As the mixture strength is altered to correct the combustion process duration, there is a interaction with the ignition timing which tends to change the start of combustion. However, the control of the ignition timing responds rapidly to correct for this as the mixture strength is adjusted to return the duration to the desired value. Thus, any conflict or instability is avoided.

By updating correction maps or schedules, for instance stored in non-volatile memory, any residual errors occurring during operation of the engine are relatively small and are quickly corrected, thus ensuring that the engine operates at or near its intended operating point for more of the time.

According to a second aspect of this invention, there is provided a method of controlling an internal combustion engine, comprising the steps of: measuring the actual positions of the crankshaft at which the combustion process starts and ends, determining a desired position of the crankshaft for the start of the combustion process and also determining a desired position of the crankshaft for the end of the combustion process or a desired duration for the combustion process, and providing signals to a first device for controlling the timing of the combustion process and to a second device for controlling the duration of the combustion process so as to cause the actual start of the combustion process to occur at the desired position and to cause the actual end of the combustion process to occur at the desired position or the actual duration of the combustion process to equal the desired duration.

BRIEF DESCRIPTION OF THE DRAWINGS

The invention will be further described, by way of example, with reference to the accompanying drawings, in which:

FIG. 1 (A) is a graph illustrating the start and end of a combustion process in relation to the mass fraction of fuel burnt;

FIGS. 1 (B) and 1 (C) are graphs illustrating signals from optical combustion sensors that are used to detect the start and end of the combustion process;

DESCRIPTION OF THE PREFERRED AN EMBODIMENT

In an internal combustion engine, both the rate of burning of fuel in the combustion chambers and the phase of the combustion period or heat release period with respect to crankshaft position have an effect on various engine performance parameters. These performance parameters include noxious exhaust emissions, fuel efficiency, combustion noise and vehicle driveability.

In embodiments of an engine control system which will be described hereinafter, the actual crankshaft positions for the start and end of the combustion periods in the combustion chambers of the engine are controlled so as to equal desired values of these positions. As will be described, the desired values are stored in a look-up table addressed by engine operating parameters, namely, engine speed and load. By controlling the start and end of the combustion periods, the rate of burning of fuel and phase of the combustion periods will also be controlled.

The desired crankshaft positions for the start and end of each combustion period are determined as follows.

Measurements are performed on a test engine at various speeds and loads and the desired positions are selected as the ones which give satisfactory values for the various engine performance parameters mentioned above. Thus, by controlling the positions for the start and end of combustion in a series of production engines, the performance parameters are kept close to their design values.

The start of combustion (SOC) and end of combustion (EOC) may be expressed in terms of the mass fraction of fuel burnt (MFB) during the combustion period. The data for mass fraction of fuel burnt may be computed from measurements made with a cylinder pressure sensor. For example, 5% and 95% of fuel burnt may be used to indicate, respectively, the start and end of combustion. The mass fraction of fuel burnt as a function of crankshaft position during a combustion process is illustrated in FIG. 1 (A) and positions are shown for the start and end of combustion.

Figure 2:
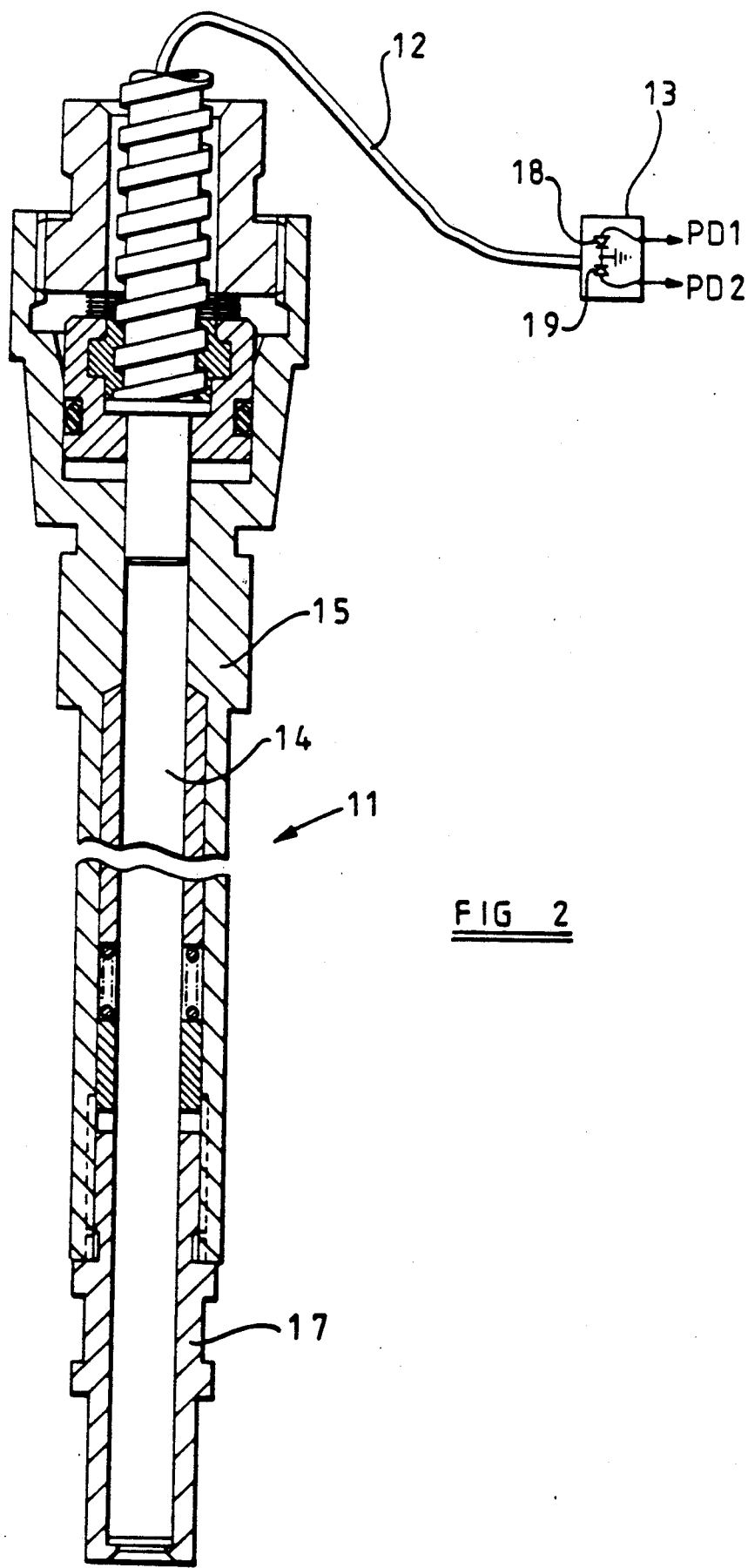
FIG. 2 is a sectional view of an optical transducer used to provide signals for determining the start and end of the combustion process.

In order to provide signals for determining the start and end of combustion, this embodiment of the invention uses the optical tranducer shown in FIG. 2. The tranducer comprises an optical probe 11 connected by means of an optical fibre bundle 12 to an assembly 13 comprising a pair of photo-sensors in the form of silicon semiconductor photodiodes 18, 19.

The probe 11 extends through the outer wall of a combustion chamber. The probe 11 comprises an optically conductive rod 14 received within a multi-part carrier 15. The rod 14 is exposed at one end to the combustion space within the combustion chamber, and thus light emitted during combustion is conducted by the rod 14 and the fibre bundle 12 to the assembly 13. The innermost end region of the carrier 15 is formed by a material resistant to the high temperatures which prevail in the combustion chamber The silicon semiconductor photodiodes 18 and 19 have spaced spectral responses. A suitable commercially available version of assembly 13 is the Sharp PD 150 colour sensor which contains a first photodiode (photodiode 18) exhibiting a peak response at 600 nm and a second photodiode (photodiode 19) exhibiting a peak response at 875 nm. Photodiodes 18 and 19 produce output signals PD1 and PD2.

In this embodiment of the invention, the ratio PD2/PD1 of the amplitudes of signals PD1 and PD2 is used to determine start of combustion. As illustrated in FIG. 1 (B), at the start of combustion, the slope of the ratio PD2/PD1 changes from horizontal to almost vertical. Thus, by detecting this change of slope, the start of combustion may be detected.

Figure 3:
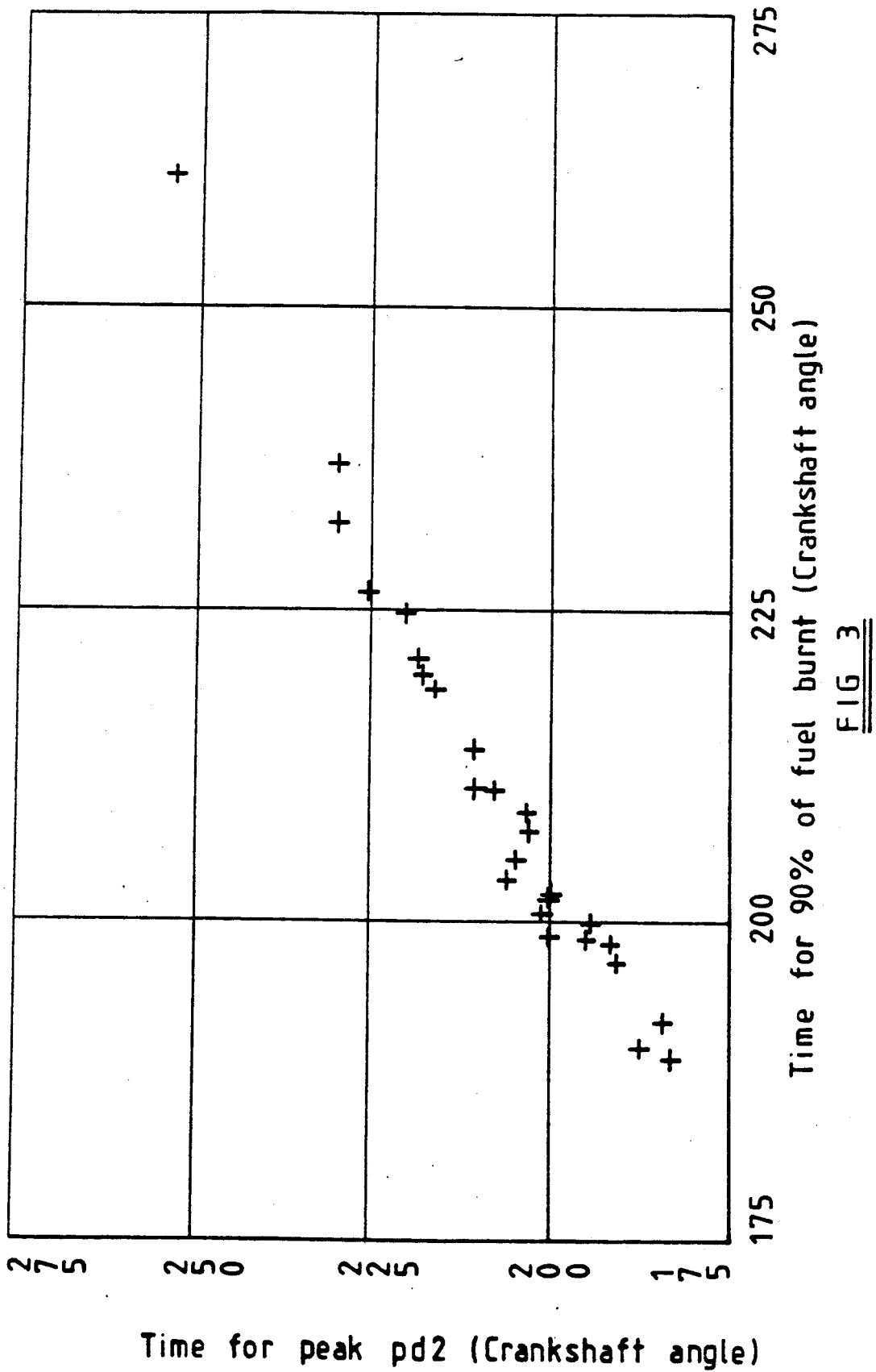
FIG. 3 is a graph illustrating the correlation between optical and cylinder pressure sensors for determining the end of the combustion process.

To detect the end of combustion, it has been found that the peak of the output signal PD2 of sensor 19 correlates directly with the time or crankshaft position at which 85 to 90% of the fuel has been burnt. This correlation is illustrated in FIG. 3, where the crankshaft angle for the peak of signal PD2 is plotted against the crankshaft angle for 90% fuel burnt as computed from cylinder pressure information. Thus the peak of signal PD2 is used to detect the end of combustion.

Figure 4:
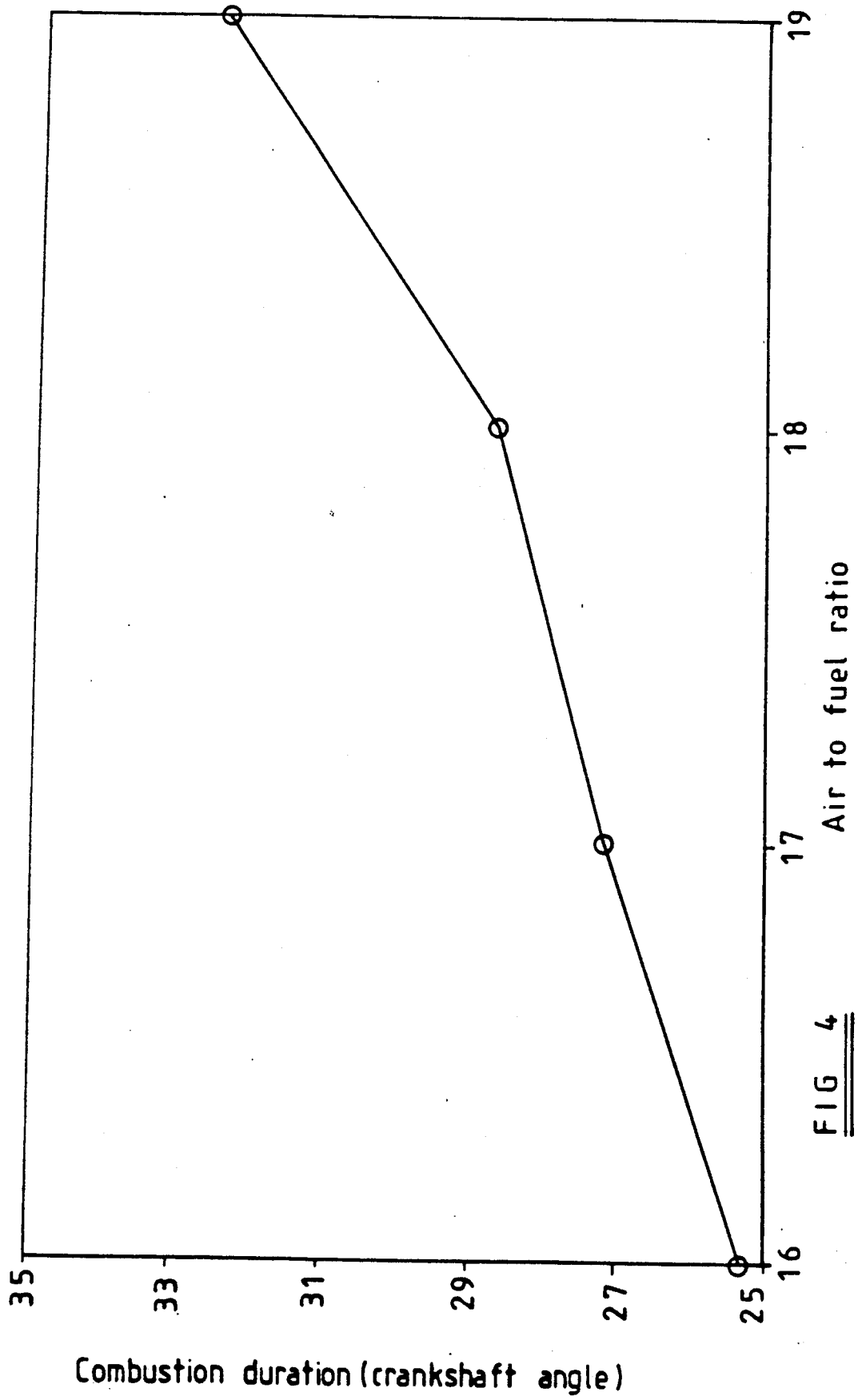
FIG. 4 is a typical graph illustrating the variation of combustion duration as measured by optical sensors with air to fuel ratio.

Referring now to FIG. 3, there is shown typical data obtained from a spark ignition test engine using the optical sensor detection of end of combustion. The engine was operated at 2000 RPM. FIG. 4 shows data for combustion duration against air to fuel ratio. for combustion duration is chosen from characteristics of this type and desired values of start of combustion chosen accordingly.

Figure 5:
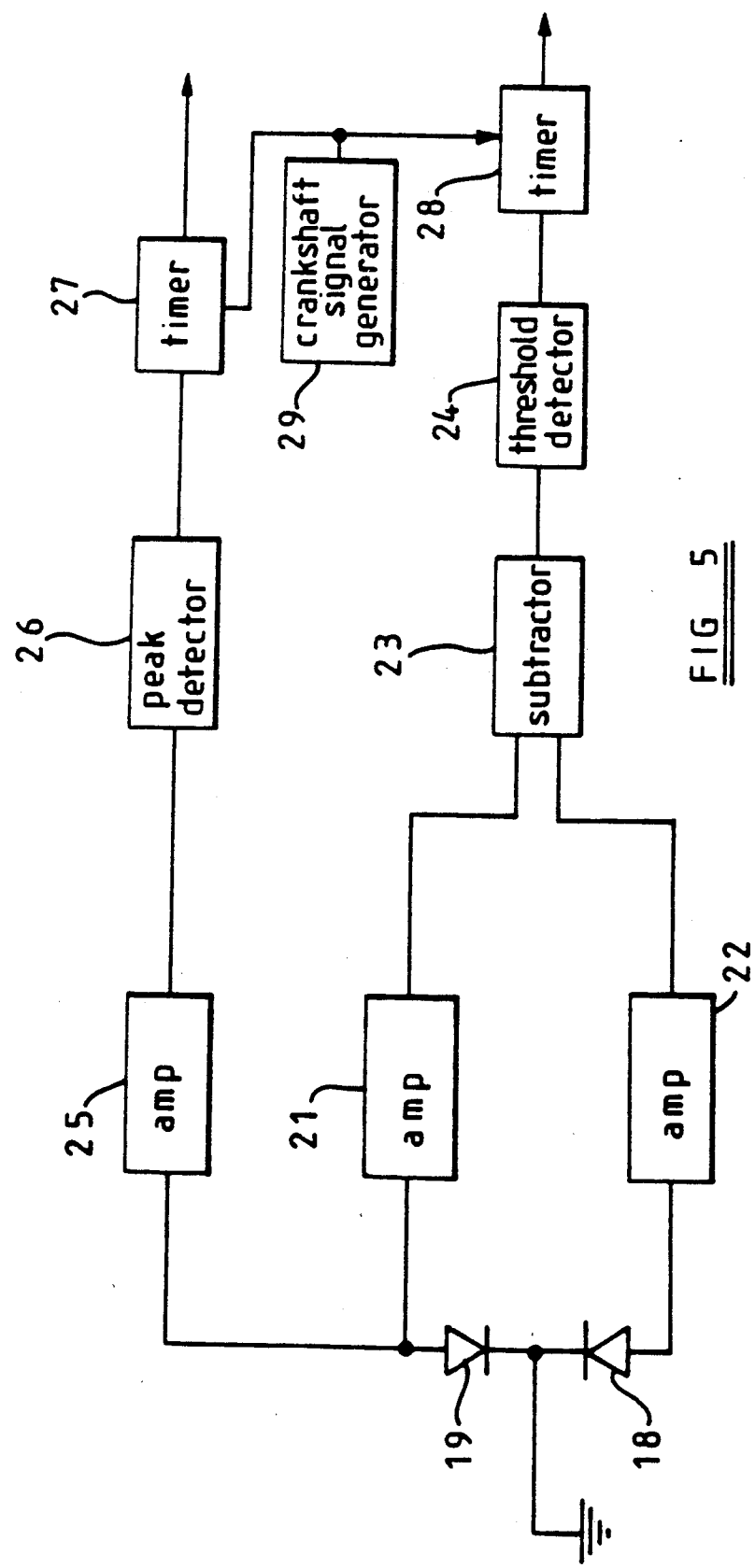
FIG. 5 is a block diagram of a circuit used in detecting the start and end of the combustion process.

Referring now to FIG. 5 there is shown the circuit associated with photodiodes 18,19. The outputs of photodiodes 18,19 are connected, respectively, to a pair of log amplifiers 21,22, the outputs of which are connected to a subtractor 23. Thus, the output of subtractor 23 represents the logarithm of PD1/PD2 and this output is supplied to a threshold detector 24 to detect the start of combustion. The output of photodiode 19 is supplied to an amplifier 25, the output of which is supplied to a peak detector 26 to detect the end of combustion. Timers 27 and 28 detect the crankshaft angles at which the start of combustion and end of combustion signals occur using signals from the crankshaft reference signal generator 29.

By way of modification, other techniques may be used to detect the start and end of combustion. For example, a pressure sensor could be used, start and end of combustion being detected from the pressure changes in the combustion chamber. Alternatively, a pair of ionization sensors could be used, one located adjacent the spark plug to detect the start of combustion and one located at the opposite end of the cylinder to detect the end of combustion.

Figure 6:
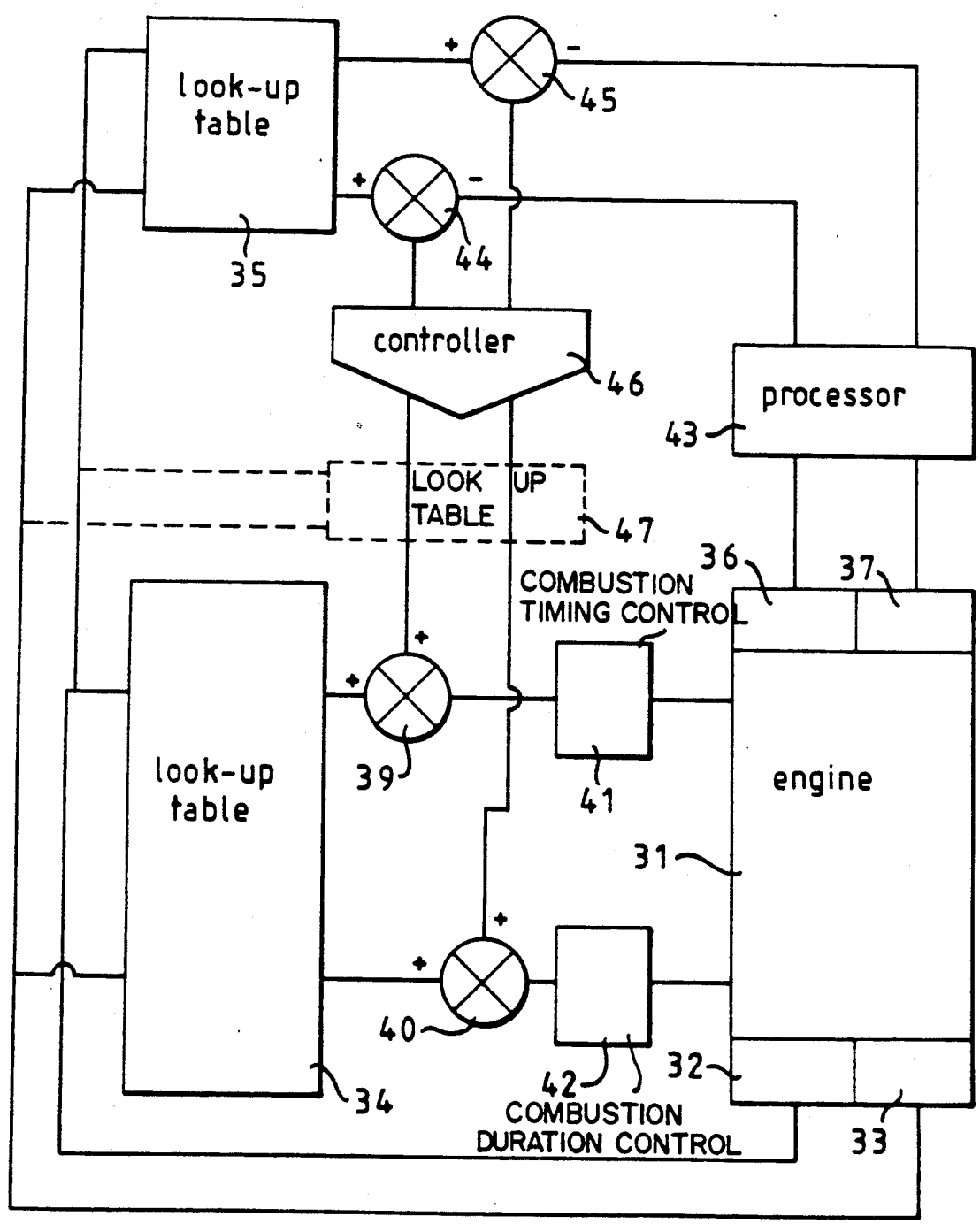
FIG. 6 is a block diagram of a control system constituting a first embodiment of the invention.

Referring now to FIG. 6, there is shown a block diagram of a control system constituting a first embodiment of the invention. The control system includes an engine 31 having engine load and speed sensors 32, 33. The outputs of sensors 32, 33 are supplied to the address inputs of a pair of look-up tables 34, 35. The engine 31 also has a pair of sensors 36, 37 to detect the start and end of combustion. The sensors 36, 37 take the form already discussed with reference to FIGS. 1 to 4.

The look-up table 34 contains a first set of base values for a device 41 for controlling combustion timing and a second set of base values for a device 42 for controlling combustion duration. Each base value for the device 41 represents a crankshaft setting near to the desired position for the start of combustion for the prevailing engine speed and load. Each base value for the device 42 represents a setting near to that required for obtaining the desired combustion duration. Look-up table 34 supplies an output representing a base value for the device 41 to a positive input of a summer 39 and an output representing a base value for the device 42 to a positive input of a summer 40. The output of summer 39 is supplied to the input of a device 41 and the output of summer 40 is supplied to the input of device 42.

The outputs of sensors 36, 37 are supplied to a processor 43. The processor 43 produces outputs representing the actual crankshaft positions for the start and end of combustion and these are supplied, respectively, to the negative inputs of summers 44, 45.

Look-up table 35 contains first and second sets of values representing respectively desired crankshaft positions for the start and end of combustion. The values are selected from measurements on a test engine in the manner described above. For the prevailing engine speed and load, look-up table 35 supplies outputs representing the desired crankshaft positions for the start and end of combustion, respectively, to the positive inputs of summers 44, 45. Thus, the output of summer 44 represents the error between desired and actual crankshaft positions for the start of combustion and the output of summer 45 represents the error between desired and actual crankshaft positions for the end of combustion. The outputs of summers 44, 45 are supplied to a controller 46.

The controller 46 processes each input separately using a suitable combination of proportional, differential and integral terms. After processing the input from summer 44, the resulting output is supplied to a further positive input of summer 39. Likewise, after processing the input from summer 45, the resulting output is supplied to a further positive input of summer 40.

As may be readily appreciated, the control system of FIG. 6 corrects errors in both combustion timing and duration so as to remove errors between actual and desired crankshaft positions for start and end of combustion.

By way of modification, the outputs from controller 46 may be stored in a look-up table shown in dashed lines and indicated by reference numeral 47. This look-up table 47 is also addressed by engine speed and load. This modification has the advantages that the correction values are stored during engine shut-down and so are immediately available after the engine is restarted.

By way of another modification, the processor 43 may be arranged to produce outputs indicating actual start of combustion and combustion duration. Look-up table 35 would then contain desired values for start of combustion and combustion duration.

In FIG. 6, the control of the combustion process is shown to be applied simultaneously to all cylinders. By way of modification, the control could be applied individually to each cylinder. In this case an individual optical transducer would be required for each cylinder and appropriate modifications to the system would be needed.

In FIG. 6, the control system is shown in a general form which is applicable for both spark ignition and compression ignition engines. For a particular engine, the devices 41, 42 must take specific forms suitable for that engine.

In a spark ignition engine, the dominant factor controlling combustion timing is the timing of the ignition sparks which ignite the fuel. Between each spark and the start of combustion, there is a delay period which occurs due to the time necessary for the flame to grow to a size capable of rapid propagation. Thus, in such an engine, the device 41 for controlling ignition timing may be a device for controlling spark timing.

In a spark ignition engine, combustion rate, and hence the combustion duration, depend to a large extent on turbulence levels and mean mixture motion such as swirl in the combustion chamber. These factors cannot easily be controlled during use. During use, the combustion period is affected by the level of dilution of the fuel mixture with air or exhaust gas where exhaust gas recirculation is provided. Thus, in such an engine, the device 42 for controlling the duration of combustion may be a device for controlling the air-to-fuel ratio or a device for controlling exhaust gas recirculation.

In a compression ignition engine, the dominant factor controlling combustion timing is the timing of fuel injection. Again a delay period exists between the start of fuel injection and the start of combustion due to the time required for mixing of the fuel spray and air and the heat transfer and precombustion reactions leading to spontaneous ignition. Thus, in such an engine, the device 41 may be a device for controlling injection timing.

In a compression ignition engine, the duration of combustion is largely determined by the rate of fuel injection and turbulence and mean mixture motion such as swirl in the combustion chamber. However, dilution by exhaust gas recirculation and fuel composition also have an effect. Thus, in such an engine, the device 42 may be a device for controlling the rate of fuel injection. Alternatively, where exhaust gas recirculation is provided, the device 42 may be a device for controlling such recirculation.

In the example described above, the second photodiode, which is the one used to detect end of combustion, is a silicon photodiode having the peak of its spectral response within the red region. Alternatively, the second photodiode may be constructed from another material providing the peak of its spectral response lies within the red or infrared region. Preferably, the peak of the response of the second photodiode lies in the wavelength range 850–950 nm. Where both the first and second photodiodes have their peak responses in the red region, it is preferred that the peak response of the second photodiode has the longer wavelength.

Figure 7:
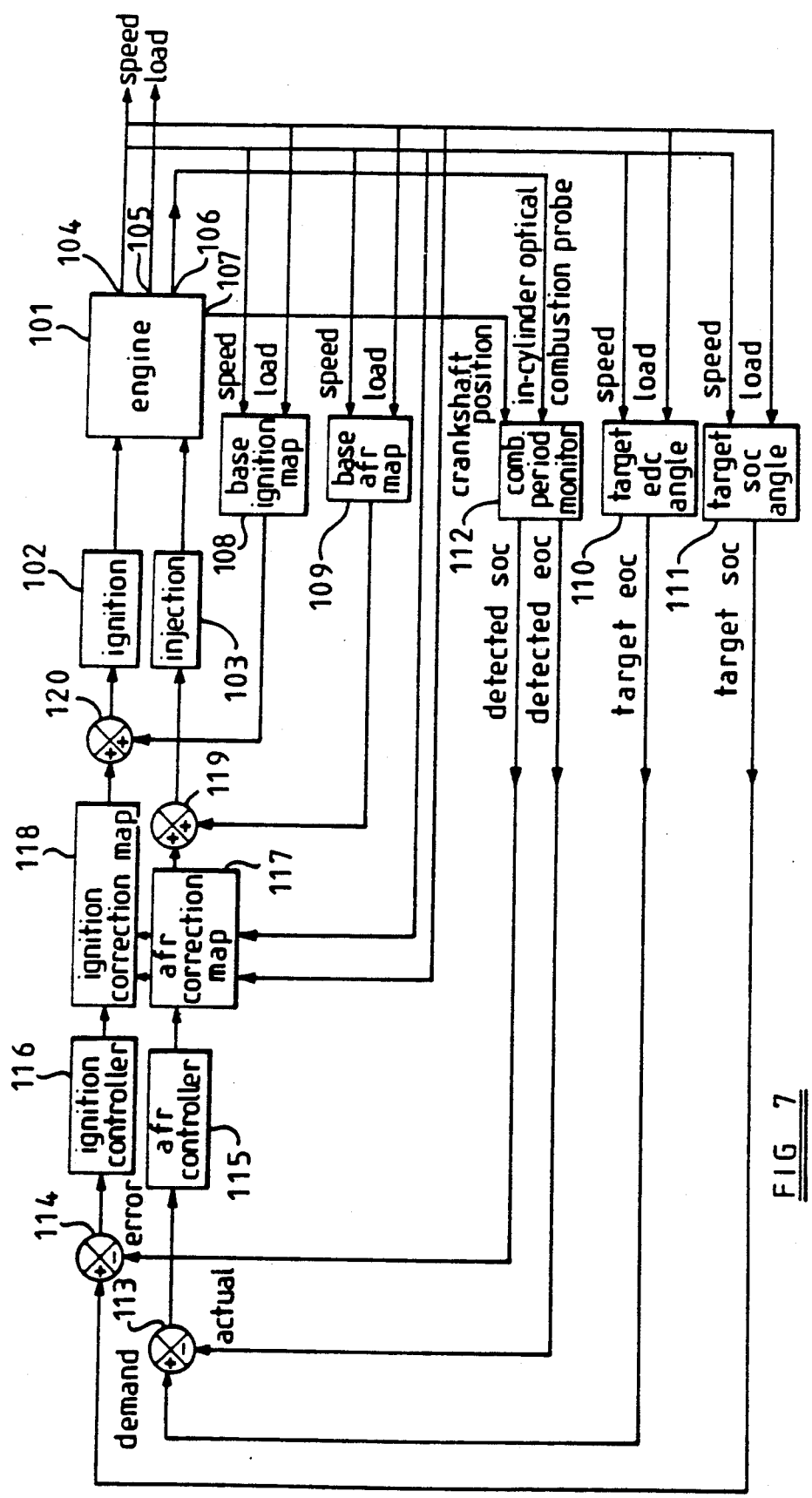
FIG. 7 is a block diagram of a control system constituting a second embodiment of the invention.

FIG. 7 shows a control system constituting a second embodiment of the invention. A spark ignition engine 101 is provided with an ignition circuit 102, for instance for controlling dwell and providing energisation for sparking plugs, and an injection control circuit 103 for driving a fuel injection system of the engine 101. The engine is also provided with transducers and/or electronic circuits providing a speed signal at an output 104 indicating the speed of the engine, a load signal at an output 105 indicating the load demand applied to the engine, a combustion signal at an output 106 indicating the state of combustion in one or more cylinders of the engine, and a crankshaft position signal at an output 107 indicating the position of the crankshaft with respect to a reference position such as top-dead-centre for number one cylinder. The combustion signal is preferably provided by an in-cylinder optical combustion probe of the type shown in FIG. 2 or any of the other types of transducers mentioned hereinbefore. The other output signals from the engine 101 may be provided by any suitable transducers and circuits, for instance of types which are well known in this technical field.

The speed and load signals are supplied as address signals to a read only memory 108 containing an ignition map of base values for ignition timing, such as spark advance. The speed and load signals are also supplied as address signals to a read only memory 109 containing a map of air/fuel ratio base values for controlling fuel mixture strength. The speed and load signals are further supplied as address signals to a read only memory 110, which contains desired or target end of combustion crankshaft angle values, and a read only memory 111, which contains desired or target start of combustion crankshaft angle values.

The crankshaft position signal and the combustion signal are supplied as inputs to a combustion period monitor circuit 112 which detects the crankshaft positions at which combustion starts and ends. The circuit 112 is preferably of the type shown in FIG. 5.

The outputs of the memories 110 and 111 are supplied to plus inputs of subtractors 113 and 114, respectively, as demand signals, whereas the detected start of combustion and end of combustion crankshaft position signals from the memory 112 representing the actual values are supplied to the minus inputs of the subtractors 114 and 113, respectively. The subtractors 113 and 114 supply error signals to an air/fuel ratio controller 115 and an ignition controller 116, respectively. A non-volatile memory 117 stores an air/fuel ratio correction map and is addressed by the speed and load signals. A non-volatile read/write memory 118 contains an ignition correction map and is addressed by the speed and load signals. The write inputs of the memories 117 and 118 are connected to the outputs of the controllers 115 and 116, respectively, for updating the values at the memory locations corresponding to the prevailing speed of the engine and the load demand on the engine.

The read outputs of the memories 117 and 118 are connected to first inputs of summers 119 and 120, respectively, whose second inputs are connected to the outputs of the memories 109 and 108 respectively. The outputs of the summers 119 and 120 are connected to the inputs of the injection circuit 103 and the ignition circuit 102, respectively.

During normal operation of the engine 101, the base values for ignition timing and air/fuel ratio for the prevailing engine speed and load demand are supplied by the memories 108 and 109 to the summers 119 and 120. The base values are corrected by adding corrections for the prevailing engine speed and load demand from the memories 117 and 118, and the corrected values are converted by the circuits 102 and 103 into sparks of the corrected timing and an air/fuel ratio of the corrected value. The combustion period monitor circuit 112 detects the actual crankshaft positions for the start and end of combustion on the basis of the output of the combustion probe. The memories 110 and 111 supply target values for the crankshaft positions at the start and end of combustion for the prevailing engine speed and load demand, and the subtractors 113 and 114 provide start and end error signals to the controllers 115 and 116. The controller 116 has a transfer function including an element comprising event integration of the start of combustion error signal. The air/fuel ratio controller 115 has a transfer function which includes an element comprising event integration of the end of combustion error. The outputs of the controllers 115 and 116 overwrite any existing values in the memories 117 and 118 for the prevailing engine speed and load demand. These correction values are then added to the base values for ignition timing and air/fuel ratio in the summers 119 and 120 so as to correct the crankshaft position at which combustion starts and the duration of combustion or the crankshaft position at which combustion ends.

The rate of integration of the controller 115 is slower than the rate of integration of the controller 116. Thus, when a disturbance occurs which alters the start and end of combustion in the engine 101, the ignition timing is corrected relatively rapidly so as to return the start of combustion to the correct crankshaft position. The air/fuel ratio is then altered relatively slowly so as to correct the duration of combustion to the target value.

Figure 8:
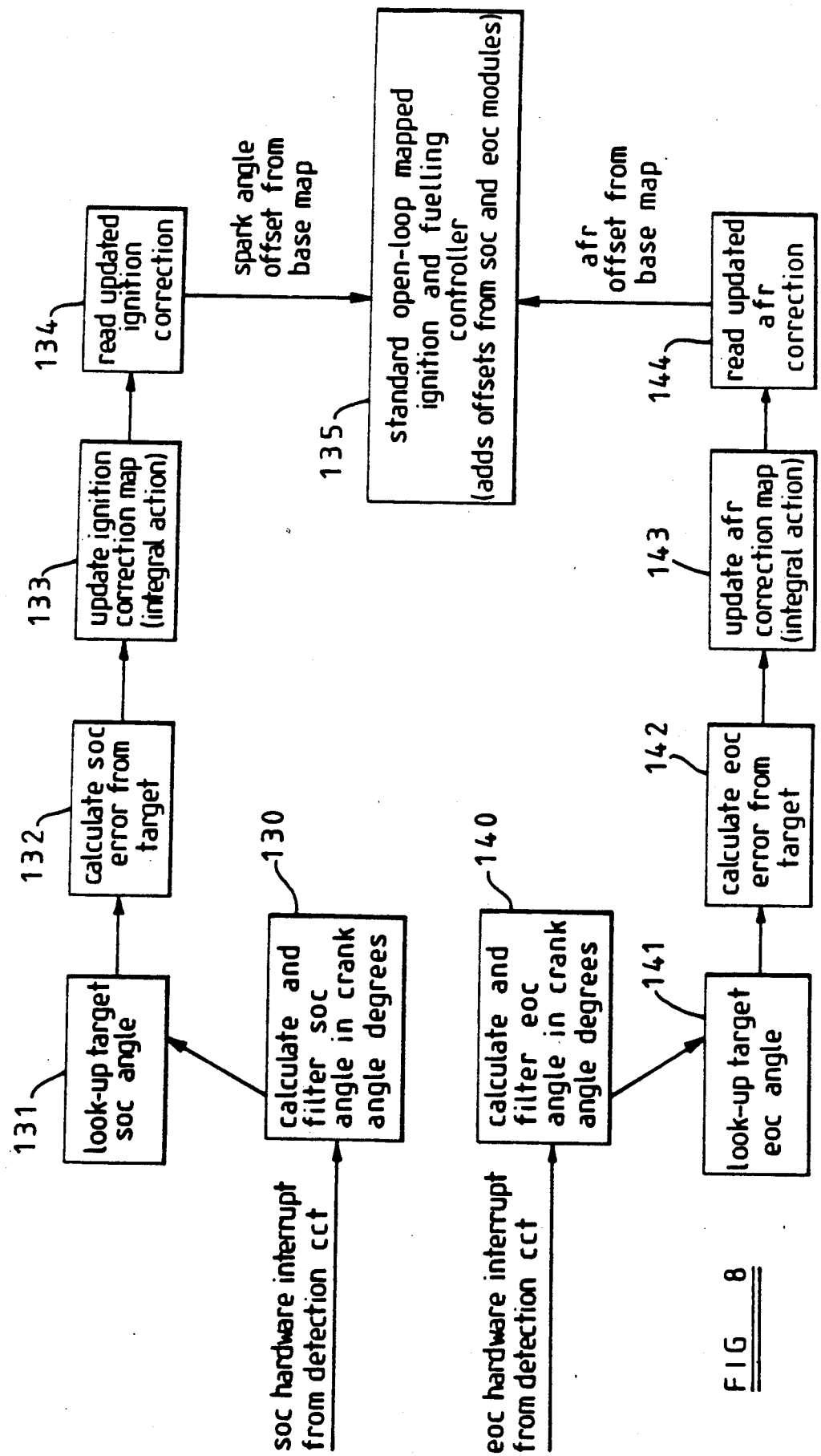
FIG. 8 is a diagram illustrating operation of the system of FIG. 7.

Although FIG. 7 illustrates the system in terms of discrete hardware circuits for performing the various functions, it is possible and, in many applications, advantageous for the system to be implemented by means of a microcomputer. Such microcomputer arrangements are known and will not therefore be comprehensively described herein. However, the operation of a microcomputer embodying the controllers 115 and 116 will be described in more detail with reference to the schematic flow chart shown in FIG. 8.

The output signals of the combustion period monitor circuit 112 are supplied as interrupts to the microcomputer. Thus, the detected start of combustion signal causes the microcomputer to perform the following interrupt routine.

The crankshaft angle in degrees is calculated from the start of combustion signal and is filtered at 130, and the target start of combustion angle is read from the memory 111 at 131. The start of combustion error is calculated from the difference between these values at 132 and the ignition correction map 118 is corrected at 133 by means of an event integral action. The updated ignition correction value is then read at 134 and is then used in the main programme, indicated at 135, to correct the base value supplied by the memory 108 for open loop mapped ignition and fuelling control.

The detected end of combustion signal causes the microcomputer to perform the following interrupt routine. The crankshaft angle in degrees for the end of combustion is calculated from the end of combustion signal and is filtered at 140, and the target end of combustion angle is read from the memory 110 for the prevailing engine speed and load demand at 141. An end of combustion error signal is calculated from the difference between these values at 142 and is used to update the air/fuel ratio correction map by integral action in the memory 117 at 143. The updated air/fuel ratio correction value is then read from the memory 117 at 144 and used in the main programme 135.

The rate of integration in the step 133 is higher than that in the step 143, for instance by applying suitable weighting constants to the integration, so that the updating of the ignition correction map is more rapid than that of the air/fuel ratio correction map.

The maps contained in the memories 108, 109, 110, and 111 are determined by experiments on one or more samples of a particular type of engine. For instance, the target end and start of combustion angle maps in the memories 110 and 111, respectively, are chosen to meet target maximum emissions of exhaust pollutants from the engine 101 while still meeting drivability and fuel economy constraints.

Figure 9:
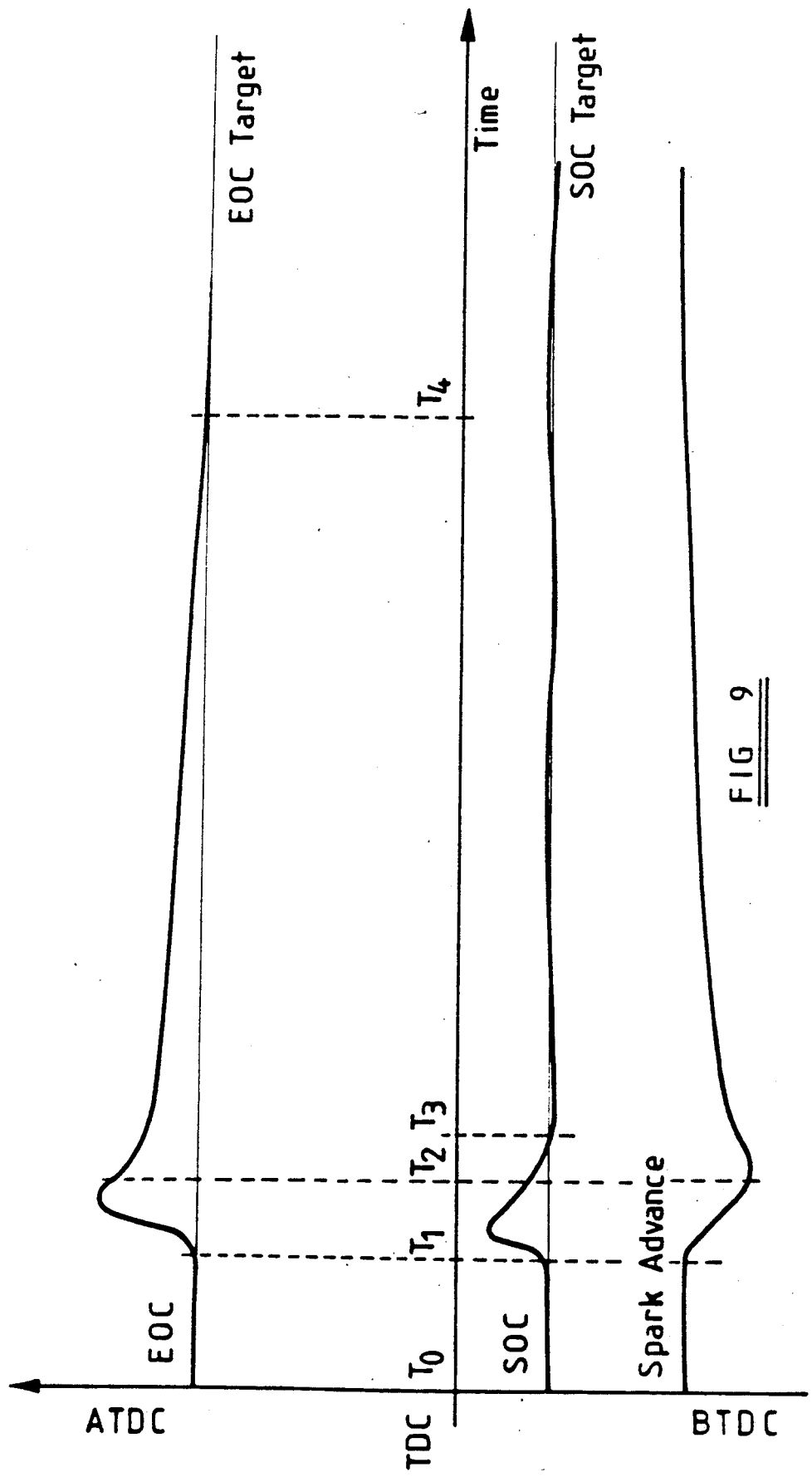
FIG. 9 shows three graphs against a common time axis of end of combustion (EOC), start of combustion (SOC), and spark advance (SA) in relation to top-dead-centre (TOC).

FIG. 9 illustrates the operation of the system shown in FIG. 7 in response to a disturbance to normal combustion. Three curves are shown with respect to a common crankshaft position axis and a common time axis.

The crankshaft position axis illustrates top-dead-centre (TDC), before top-dead-centre (BTDC) and after top-dead-centre (ATDC). The bottom curve illustrates ignition timing in the form of spark advance, the middle curve illustrates the crankshaft positions for start of combustion (SOC) in relation to a target value. The top curve shows end of combustion (EOC) crankshaft positions relative to a target value.

Between times $T_0$ and $T_1$, the start and end of combustion angles are at the target values. Assuming that the engine speed and load demand are constant throughout the time interval illustrated in FIG. 9, the spark advance angle and the air/fuel ratio (not shown) also remain constant during the interval between $T_0$ and $T_1$.

At the time $T_1$, a disturbance to normal combustion occurs, for instance because of a partially blocked fuel injector. The resulting change in the air/fuel ratio causes both the start and end of combustion angles to become delayed relative to the target values because the air/fuel ratio has increased, leading to a leaner mixture. The spark advance angle begins to change relatively rapidly and almost immediately after the occurrence of the disturbance at the time $T_1$, whereas the air/fuel ratio alters to enrich the mixture more slowly and only begins providing correction around a time $T_2$.

By time $T_3$, the change in the spark advance angle has returned the start of combustion angle to the target value. However, correction to the air/fuel ratio continues more slowly until a time $T_4$. While the air/fuel ratio is being corrected i.e., between the time $T_3$ and the time $T_4$, the changing air/fuel ratio causes minute variations in the start of combustion angle which are rapidly corrected and held to a very small amplitude by the rapid response provided by altering the spark advance angle. However, this has little effect on the air/fuel ratio, which is steadily and relatively slowly altered so as to return the end of combustion angle to the target value at the time $T_4$. After the time $T_4$, correction is complete and the start and end of combustion angles remain at the target values until the occurrence of another disturbance or change, for instance, to the engine operating conditions.

The systems thus provides stable and effective control of the start and end of combustion in an internal combustion engine while providing a rapid response to disturbances and avoiding problems resulting from any interaction between control of ignition timing and of mixture strength. The system may be used, as described above, with spark-ignition engines of both two-stroke and four stroke cycle types. The system may also be used with compression-ignition (diesel) engines, for example with ignition timing being controlled by varying the timing of fuel injection and mixture strength being controlled by varying the amount of recirculated exhaust gases in the mixture supplied to the engine.

We claim:

1. A control system for an internal combustion engine, comprising a first device for controlling the timing of the combustion process; a second device for controlling the duration of the combustion process; means for providing first and second signals representing respectively the actual positions of a crankshaft of the engine at which the combustion process starts and ends; means for determining a desired position of the crankshaft for the start of the combustion process, and also a desired position of the crankshaft for the end of the combustion process, said determining means determining the desired crankshaft positions in accordance with engine operating conditions; and means for correcting the timing and duration of the combustion process in accordance with a control strategy so as to cause the actual start of the combustion process to occur at the desired position and to cause the actual end of the combustion process to occur at the desired position, said correcting means being responsive to the first and second signals and to said determining means and providing outputs for said first and second control devices.

2. A system as claimed in claim 1, in which said determining means is arranged to determine desired positions of the crankshaft for the start and end of the combustion process, said correcting means is arranged to compare the desired and actual positions of the crankshaft for the start of the combustion process to provide a first error signal and the desired and actual positions of the crankshaft for the end of the combustion process to provide a second error signal, and said correcting means is arranged to use the first and second error signals, respectively, to provide outputs to said first and second devices.

3. A system as claimed in claim 1, in which said means for providing the second signal representing the end of the combustion process comprises an optical sensor arranged to sense light generated during combustion within a combustion chamber of the engine and having a spectral response with a peak within a red region.

4. A system as claimed in claim 3, in which the peak spectral response lies in a range 850 to 950 nm.

5. A system as claimed in claim 3, in which said optical sensor is a photodiode made from a silcon-based material.

6. A system as claimed in claim 1, in which said means for providing the first and second signals comprise first and second optical sensors having spaced spectral responses and arranged to sense light generated during combustion in a combustion chamber of the engine, said providing means being arranged to calculate a ratio of outputs of said first and second sensors and to use the ratio for providing the first signal, and to use the output of one of said sensors to provide the second signal.

7. A system as claimed in claim 6, in which said one of said sensors has a spectral response with a peak in a red region.

8. A system as claimed in claim 6, in which each of said first and second optical sensors has a spectral response with a peak in a red region and the spectral response peak of said one of said sensors has a longer wavelength than the spectral response peak of another of said sensors.

9. A system as claimed in claim 1 for use with a spark ignition engine, in which said first device for controlling the timing of the combustion process comprises a device for controlling timing of ignition sparks and said second device for controlling the duration of the combustion process comprises a device for controlling dilution of fuel mixture.

10. A system as claimed in claim 1 for use with a compression ignition engine, in which said first device for controlling the timing of the combustion process comprises a device for controlling timing of fuel injection and said second device for controlling the duration of the combustion process comprises a device for controlling rate of fuel injection or the dilution of the fuel mixture with recirculated exhaust gas.

11. A system as claimed in claim 1, in which said correcting means is arranged to correct the actual start of the combustion process more quickly than the actual end of the combustion process.

12. A system as claimed in claim 11, in which said correcting means is arranged to form a first error signal from a difference between the first signal and the desired position of the crankshaft at the start of the combustion process and a second error signal from a difference between the second signal and the desired position of the crankshaft at the end of the combustion signal, and to correct the actual start and the actual end of the combustion process in accordance with integrals of the first and second error signals, respectively, with a rate of integration of the first error signal being faster than a rate of integration of the second error signal.

13. A control system for an internal combustion engine, comprising: a first device for controlling the timing of the combustion process; a second device for controlling the duration of the combustion process; means for providing first and second signals representing respectively the actual positions of a crankshaft of the engine at which the combustion process starts and ends; means for determining a desired position of the crankshaft for the start of the combustion process, and also a desired duration for the combustion process, said determining means determining the desired crankshaft position and desired duration in accordance with engine operating conditions; and means for correcting the timing and duration of the combustion process in accordance with a control strategy so as to cause the actual start of the combustion process to occur at the desired position and to cause the actual duration of the combustion process to be equal to the desired duration, said correcting means being responsive to the first and second signals and to said determining means and providing outputs for said first and second control devices.

14. A system as claimed in claim 13, in which said correcting means is arranged to correct the actual start of the combustion process more quickly than the actual duration of the combustion process.

15. A system as claimed in claim 13, in which said first device includes means for providing a base value for the timing of the combustion process in accordance with engine operating conditions, said second device includes means for providing a base value for the duration of the combustion process in accordance with engine operating conditions, and said correcting means includes first means for applying a correction to the base value for the timing in accordance with engine operating conditions and second means for applying a correction to the base value for the duration in accordance with engine operating conditions.

16. A system as claimed in claim 15, in which said correcting means is arranged to update the correction applied by said first and second means for prevailing engine operating conditions in accordance with integrals of the first and second error signals.

17. A method of controlling an internal combustion engine, comprising the steps of: measuring actual positions of a crankshaft of the engine at which a combustion process starts and ends, determining a desired position of the crankshaft for the start of the combustion process and also determining a desired position of the crankshaft for the end of the combustion process; and providing signals to a first device for controlling timing of the combustion process and to a second device for controlling duration of the combustion process so as to cause an actual start of the combustion process to occur at the desired position and to cause an actual end of the combustion process to occur at the desired position.

18. A method of controlling an internal combustion engine, comprising the steps of: measuring actual positions of a crankshaft of the engine at which the combustion process starts and ends, determining a desired position of the crankshaft for the start of the combustion process and also determining a desired duration for the combustion process, and providing signals to a first device for controlling timing of the combustion process and to a second device for controlling duration of the combustion process so as to cause an actual start of the combustion process to occur at the desired position and to cause an actual duration of the combustion process to equal the desired duration.

* * * * *